US009507413B2

(12) United States Patent
Gee

(10) Patent No.: US 9,507,413 B2
(45) Date of Patent: Nov. 29, 2016

(54) TAILORING VEHICLE HUMAN MACHINE INTERFACE

(75) Inventor: Robert Gee, Lake Barrington, IL (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 195 days.

(21) Appl. No.: 12/960,300

(22) Filed: Dec. 3, 2010

(65) Prior Publication Data
US 2012/0143391 A1  Jun. 7, 2012

(51) Int. Cl.
*G06F 3/01* (2006.01)
*B60K 37/00* (2006.01)
*G06F 9/44* (2006.01)
*G06F 3/048* (2013.01)

(52) U.S. Cl.
CPC ............. *G06F 3/01* (2013.01); *B60K 37/00* (2013.01); *G06F 3/011* (2013.01); *G06F 3/048* (2013.01); *G06F 9/4443* (2013.01); *B60K 2350/00* (2013.01); *G06F 2203/011* (2013.01)

(58) Field of Classification Search
USPC .............. 701/1, 36, 400, 487, 538; 715/700; 345/650, 661, 676, 501, 520
See application file for complete search history.

(56) References Cited

U.S. PATENT DOCUMENTS

| | | | | |
|---|---|---|---|---|
| 5,726,688 A * | 3/1998 | Siefert et al. | ................. | 715/821 |
| 6,029,110 A * | 2/2000 | Zuber et al. | ................. | 701/400 |
| 7,765,058 B2 * | 7/2010 | Doering | ................. | 701/123 |
| 2002/0070852 A1 * | 6/2002 | Trauner et al. | ................. | 340/438 |
| 2004/0254886 A1 * | 12/2004 | Siepen et al. | ................. | 705/51 |
| 2006/0190822 A1 * | 8/2006 | Basson et al. | ................. | 715/700 |
| 2007/0124043 A1 * | 5/2007 | Ayoub et al. | ................. | 701/36 |
| 2007/0124044 A1 * | 5/2007 | Ayoub et al. | ................. | 701/36 |
| 2007/0124045 A1 * | 5/2007 | Ayoub et al. | ................. | 701/36 |
| 2007/0124046 A1 * | 5/2007 | Ayoub et al. | ................. | 701/36 |
| 2009/0069953 A1 * | 3/2009 | Hale et al. | ................. | 701/1 |
| 2009/0125199 A1 * | 5/2009 | Kaigawa | ............... | B60W 10/06 701/54 |
| 2009/0306883 A1 * | 12/2009 | Faenger et al. | ................. | 701/200 |
| 2012/0053759 A1 * | 3/2012 | Lowrey | ................. | G01C 21/26 701/2 |

* cited by examiner

Primary Examiner — Rami Khatib

(57) ABSTRACT

Methods and systems for analyzing communication options, including determining one or more driving factors, being provided with one or more HMI tailoring options, and analyzing the one or more driving factors and the one or more HMI tailoring options to determine an optimum HMI tailoring option.

16 Claims, 5 Drawing Sheets

TAILORING VEHICLE HUMAN MACHINE INTERFACE

I. BACKGROUND

The invention relates generally to the field of tailoring vehicle HMI to driving factors.

II. SUMMARY

In one respect, disclosed is a method for tailoring a vehicle Human Machine Interface, including: determining one or more driving factors; being provided with one or more HMI tailoring options; and analyzing the one or more driving factors and the one or more HMI tailoring options to determine an optimum HMI tailoring option.

In another respect, disclosed is a system for tailoring a vehicle Human Machine Interface, the system comprising one or more processors; one or more memory units coupled to the one or more processors; the system being configured to: determine one or more driving factors; be provided with one or more HMI tailoring options; and analyze the one or more driving factors and the one or more HMI tailoring options to determine an optimum HMI tailoring option.

In yet another respect, disclosed is a computer program product stored on a computer operable medium, the computer program product comprising software code being effective to: determine one or more driving factors; be provided with one or more HMI tailoring options; and analyze the one or more driving factors and the one or more HMI tailoring options to determine an optimum HMI tailoring option.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 1:
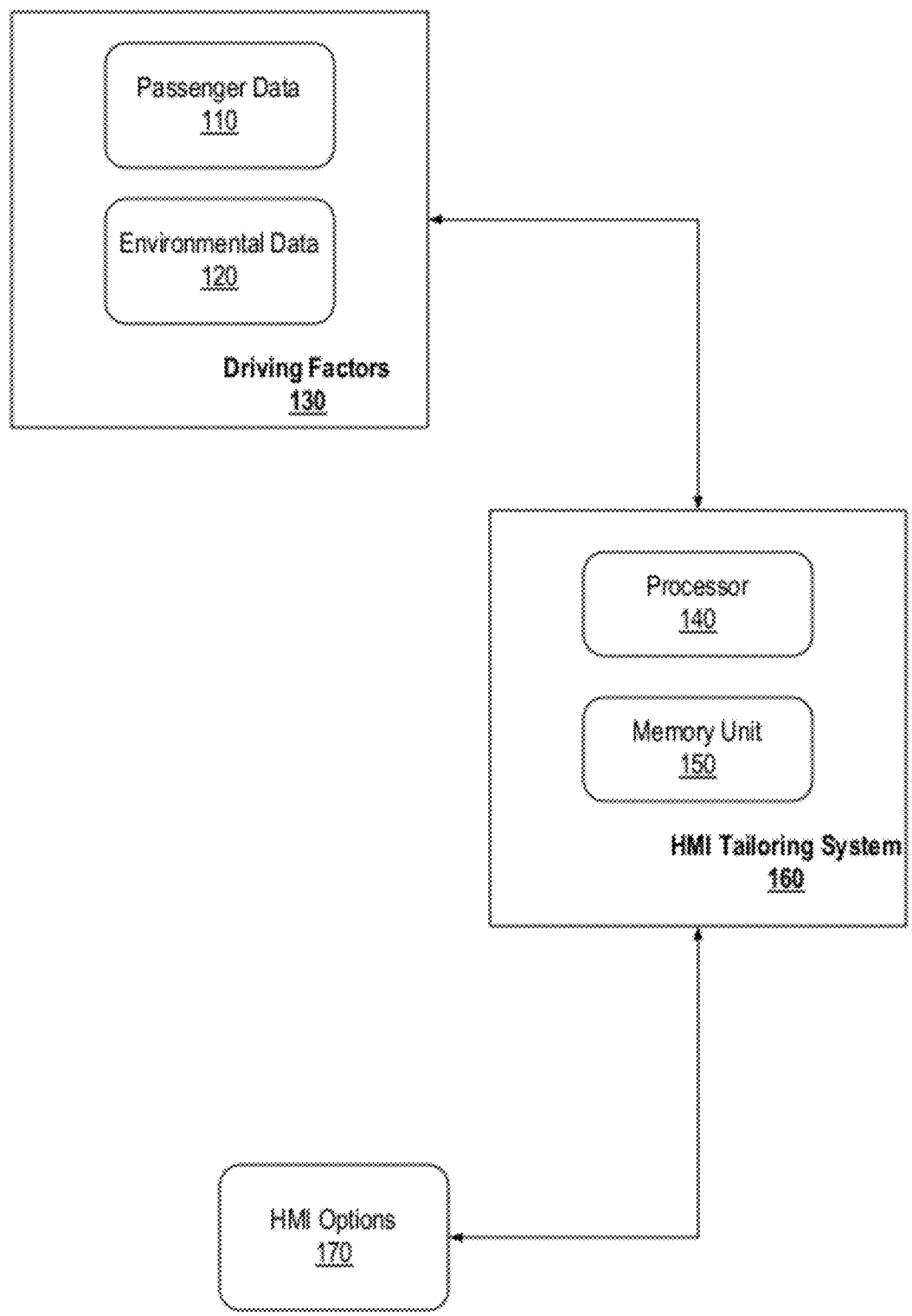
FIG. 1 is a block diagram illustrating a system for tailoring vehicle Human Machine Interfaces, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

In some embodiments, systems and methods are disclosed for determining one or more vehicle Human Machine Interface (HMI) tailoring options. One or more driving factors and one or more vehicle HMI tailoring options are analyzed and, in response to analyzing the one or more driving factors and one or more vehicle HMI tailoring options, one or more optimum vehicle HMI tailoring options are determined. Driving factors may include static environmental conditions, dynamic environmental conditions, static vehicle occupant conditions, and dynamic vehicle occupant conditions. Driving factors may also include predicted driving factors that may be calculated from having knowledge of the route, past history of the conditions, etc. HMI tailoring options may include interior lighting, music, TTS voices, driving interfaces, etc.

Static environmental conditions are unchanging conditions related to a location that may influence the driving experience and may include curves in the road, descents/ascents, features of the roadway and surrounding scenery such as tunnels, bridges, forests, mountains, cliffs, etc, or local attractions and culture such as Disneyland in California, Jazz culture in New Orleans, etc.

Dynamic environmental conditions are changing conditions that may influence the driving experience and may include traffic; hazardous areas such as construction or accident sites; events such as parades; weather related conditions such as rain, snow, fog, time of day (and lighting conditions), day of the week, season or holidays, etc.

Static vehicle occupant conditions are unchanging conditions relating to vehicle occupant preferences for vehicle HMI and changes to vehicle HMI in response to various driving factors.

Dynamic vehicle occupant conditions are changing conditions relating to any indicator of the emotional state of vehicle occupants that could benefit from tailored HMI such as stress, happiness, sadness, etc. State and number of vehicle occupants may be determined in a number of ways: through the use of sensors to determine occupant presence and size; through use of video cameras to determine occupant activities (e.g. singing, waving arms, yelling, sitting still, etc.) or demeanor (e.g. smiling, frowning, etc.); through use of audio sensors to analyze conversations or tone of voice to determine if passengers are animated, upset, having a romantic conversation, etc.; through measurement of pulse, heart rate, perspiration, etc. to determine if passengers are stressed or anxious, etc.

In some embodiments, several other factors may be considered in determining the one or more optimum HMI tailoring options and/or when and how often to use the one or more optimum HMI tailoring options. Other such factors may include the number of vehicle occupants, the behavior of vehicle occupants, the driver's emotional state (calm, stressed, happy) and passenger preferences. For example, if the system detects that the driver is drowsy and that the route ahead is monotonous (no known items of interest to help keep the driver alert), the system may modify the HMI to keep the driver awake by brightening interior lights, modifying the internal temperature, opening windows, changing music selection or music volume, or possibly sounding alerts or vibrating the driver's seat if the system detects that they have fallen asleep. The system may also incorporate feedback, learning what techniques work best for a given driver or passenger and adjusting HMI according to driver and passenger reactions.

In some embodiments, the analysis of the driving factors and vehicle HMI tailoring options and the determination of one or more optimum vehicle HMI tailoring options may be performed in a vehicle in order to adapt to local legislation, for example. In other embodiments, the analysis of the survival options may be performed in other transportation systems such as airplanes, boats, snow vehicles, submarines, etc. In yet other embodiments, aspects of the invention may be applied to situations that do not involve vehicles where the best HMI tailoring option(s) may be required. It should be noted that the various embodiments presented here may be discussed in the context of vehicles; however, the application of the invention should not be interpreted to be limited to those situations.

Location may be one of the static environmental conditions. Location may be used in conjunction with map data, for example, to determine the situation in which the driver and vehicle occupants will find themselves and then tailor the HMI accordingly. For example, location information may be used in conjunction with map data to predict that the vehicle will encounter sharp curves or steep cliffs ahead and tailor the lighting and music to calm the driver in preparation for these difficult and stressful driving conditions.

Location information may also be used to obtain additional information using appropriate databases. For example, location information may be used to obtain weather information by looking up the weather information associated with that location in a weather database. Location information may also be used, for example, to change TTS voices to inform or entertain passengers by using voices that reflect local attractions, culture, celebrities, etc. For example, the navigation system may switch its TTS voice to that of Arnold Schwarzenegger as the vehicle enters California or may use a Mickey Mouse voice within 10 miles of Disneyland. This tailoring could also be used by advertisers to remind passengers of nearby attractions and businesses. Another use of location information may be to assist drivers to conform to local legislation by turning on the headlights, for example, when windshield wipers are engaged to conform to Illinois law.

In some embodiments, location information may be obtained using satellite information such as GPS, Galileo, etc. Location information may also be obtained, for example, using radio frequency triangulation techniques using one or more electromagnetic signals. Electromagnetic signals (even if 2-way communication is not possible) may include cellular tower signals, Wi-Fi signals, FM/AM radio station signals, etc.

Vehicle location determination may also be performed or aided by map-matching, street sign recognition, and/or other object/landmark recognition (where the position of such objects may be known or estimated).

Vehicle location may also be determined using alternative reckoning techniques, such as dead reckoning. In some embodiments, the location of the vehicle may be determined using an initial known location, accelerometers, time, and equations of motions to calculate the current location. The vehicle would use such information to predict a time to encounter the factors, sequence of factors, and duration of factors, to enable tailoring of the HMI to the predicted pattern of factors.

Date and time may be another of the driving factors. Time may be used, for example, to determine whether it is day or night in order to determine when to dim or brighten internal lighting. Time may also be used to determine whether other people or traffic may be in the vicinity. Date information may be used to determine average weather information such as temperature, rainfall, etc. Time and date may also be used to determine what type of HMI tailoring is appropriate. For example at 8 AM on a weekday, the system may assume that the vehicle driver is on their way to work and may use more serious TTS tones and reserve more festive HMI tailoring for evenings or weekends.

Weather information may be another of the driving factors. Weather information may include rainfall, ambient light levels, electrical activity from lightning, audible activity from thunder, cloud cover, fog conditions, snow cover, ambient temperatures, etc.

Weather information may be used, for example, to anticipate driving conditions that may be stressful for the driver and passengers and adjust vehicle HMI accordingly. For example, if the visibility is extremely low due to rain or fog, interior lighting may be dimmed to help the driver to focus outside the vehicle and music may be set to encourage slower driving.

In some embodiments, weather information may be determined using on-board sensors such as temperature sensors, rain sensors, humidity sensors, pressure sensors, audio sensors, light sensors, etc. In other embodiments, weather data may be received through weather broadcast. In yet other embodiments, weather data may be received over a data connection through the cellular network or a Wi-Fi station, for example.

In some embodiments, weather information may also be estimated indirectly, such as through the use of the vehicle's traction control system to determine friction at the tires (suggesting rain/snow/ice) and also related temperature sensors (e.g., temperature<0 degrees C., and traction control indicating minimal friction/traction).

Ambient light information may be yet another one of the driving factors. Ambient light information, in some embodiments, may be determined using one or more light sensors. In other embodiments, ambient light information may be determined using date and time information and a database that includes sunrise and sunset information, for example.

In some embodiments, ambient light information may be used to predict the mood of passengers or determine interior lighting settings. For example if it is dark during the afternoon (or if it is predicted to be dark during the afternoon due to a forecast of heavy storms and other meteorological data), the system may determine that the gloomy weather might affect the mood of the passengers and might play cheerful music. In other embodiments, ambient light information may used to determine nearby traffic and perhaps the flow of that traffic to assist in the selection of HMI tailoring options to implement. In yet other embodiments, light sensors may be used to detect changes in light activity that may indicate nearby activity, such as a person or a vehicle walking or driving by or even to gauge how much stimulus the vehicle occupants are receiving from their surroundings. For example, at night in an urban entertainment district, there may be many flashing lights vying for the driver's and passengers' attention.

Digital imaging information, including video and/or still image information, may be yet another one of the driving factors. Digital imaging information, in some embodiments, may be obtained using one or more digital imaging cameras placed inside as well as outside of the vehicle. For example, cameras may be used to gauge the vehicle occupants' condition by seeing if they are smiling, laughing, frowning, singing, dancing in their seats, etc. Other uses of digital imaging include determining traffic levels or weather conditions.

Audio information may be yet another one of the driving factors. Audio information, in some embodiments, may be obtained using one or more microphones placed inside and/or outside the vehicle. Such microphones may provide audio information via wire or wirelessly. Audio may be used to gauge activity outside the car as well as to evaluate the vehicle occupants' condition by analyzing the tone, volume, etc of their voice, whether they are singing, etc.

In some embodiments, audio information may be used to supplement other information. For example, external sounds may used to verify the accuracy of traffic reports, construction reports, event plans, or geographical data.

In some embodiments, radar may be used to determine one or more obstacles in the vicinity such as other vehicles, hills, buildings, etc. The information may then be used to determine an approximate location and/or orientation of the vehicle. In other embodiments, radar may also be used to monitor for activity in the vicinity, prompting communications that are directed in the direction of the activity. In yet other embodiments, the information detected using radar may be compared to existing databases in order to derive additional information. Radar information may also be used in order to determine whether the vehicle is in the vicinity of dangerous ground, such as a nearby cliff, for example.

Many other types of driving factors may be sensed and monitored or predicted and be taken into account when determining one or more optimum HMI tailoring options. Databases containing information of when and where construction workers may be working or when and where school children may be walking or when and where people may be present may be used.

In some embodiments, all the collected information may be used to determine one or more optimum HMI tailoring options and the frequency with which to implement each of the one or more optimum HMI tailoring options. For example, the vehicle HMI may be adjusted based on time of day, ambient light levels, weather and map data. These data could be used to predict the need to dim the instrument display before entering a tunnel and then brighten the display as the vehicle approaches the exit to the tunnel. In long tunnels, the weather could be different at either end. If there is data to suggest that it is raining at the exit of a tunnel, passengers may receive a notification, the windows may be closed and the headlights turned on prior to exiting the tunnel.

Information that may be combined may include available broadcast weather data, including barometric data if available, (in some embodiments, supplemented with on-board rain/water sensors), light levels, time of day, RADAR/LIDAR reflections (as may be caused by rain or fog or other obstructions), vehicle orientation, GPS/satellite signal strength (suggesting environmental conditions such as visibility), water conditions (as such conditions may cause hazardous driving conditions especially with a vehicle being off road or on a steep hill), potentially dangerous temperature shifts, etc.

In some embodiments, one or more HMI tailoring options may be considered. Depending on available resources, one or more of these HMI tailoring options may be used in parallel or in series to increase the likelihood that the vehicle occupants' emotional state will improve. For example, the interior lighting may be dimmed in conjunction with changing the music, cooling the cabin temperature and changing the throttle response in parallel to calm the driver and passengers.

In some embodiments, vehicle HMI modifications may include changes to vehicle handling and driver controls. For example, as the vehicle approaches a hazard (may be determined from dynamic or static data), the accelerator pedal may be made less sensitive, the steering sensitivity may be adjusted, to help calm the driver and prevent tire slippage. Interior display lighting may dim slightly to help relax the driver this potentially stressful environment.

In some embodiments, passenger preferences may be used to improve the vehicle HMI tailoring. For example, some users may find classical music to be calming and indicated that they prefer to have the music switch to classical in heavy traffic. Others may indicate that they get nervous and perspire in traffic and prefer that the cabin temperature be lowered in heavy traffic. Passenger preferences may be used to tailor any aspect of vehicle HMI for any driving factor.

In some embodiments, vehicle HMI may be tailored to help the driver drive more safely. For example, if the driver is driving aggressively (as measured by speed relative to the posted limits, swerving, etc.) the vehicle HMI may be tailored to help relax the driver. If the driver is driving slowly relative to posted speed limits, the vehicle HMI may be tailored to boost driver energy and attentiveness.

In some embodiments, the system may tailor the vehicle HMI not only for imminent conditions, but may also consider conditions further down the road. For example, if data suggests that the roads will be icy in ten minutes, the system may begin preemptively modifying the vehicle HMI to calm the driver and providing a notification so that he/she is not caught off guard when the road gets slippery.

In some embodiments, passenger activity and behavior maybe be considered in the vehicle HMI tailoring. For example, if the driver and passengers are involved in conversation, the music volume may be lowered. If on the other hand, vehicle occupants are singing along with the music, the next music selections may be made to encourage such behavior by playing occupants' favorite tunes or well-known hits.

In some embodiments, the vehicle HMI may be tailored to multiple occupants. For example, if children are in the car, TTS voices may be those of cartoon characters and grammar may be simplified for the children's benefit.

In some embodiments, the time of day, destination or knowledge of the driver's calendar may be taken into account in determining the vehicle HMI tailoring. For example, early on a weekday morning the system may assume the driver is on their way to work and the HMI may be more formal, while in the evening while the driver is unwinding on their way home, the HMI may be more relaxed and festive. If the driver is on their way to a meeting, the HMI may also be more formal and unobtrusive.

In some embodiments, after the one or more driving factors are detected and one or more HMI tailoring options are provided, an analysis is performed to determine one or more optimum HMI tailoring options (and/or the manner in which these options are applied). For example, a conditional probability of effectiveness may be determined according to some pre-defined algorithm for each of the HMI tailoring options in order to determine which HMI tailoring option to use. For each HMI tailoring option, the one or more HMI tailoring-related conditions may be considered according to their effect and state to determine a probability of successful HMI tailoring for each of the available HMI tailoring options. In some embodiments, the HMI tailoring option(s) having the highest probability of success may be selected as the HMI tailoring option.

In other embodiments, additional HMI tailoring options may be considered and a combined probability may be constructed indicative of the effectiveness of a combination and frequency of multiple HMI tailoring options. For example, a sequence (or the parallel application) of one or more HMI tailoring options having the highest probability of success may be considered and implemented.

In some embodiments, sensors may be used to determine the emotional state of the one or more persons involved. Examples of such sensors may include sensors embedded into the seats to detect breathing and heart rates, digital imaging sensors to detect general body movement and eye movement, audio sensors to detect human sounds, etc. In some embodiments, the detected information may also be supplemented with retrieved personality profiles (which may also include medical profiles) for each of the one or more persons involved. In other embodiments, the personality profiles may be obtained with the Q&A by the system. The personality profiles may be stored locally or the profiles may be recovered over a data connection (the data connection may be to a local device or to a remote server). One or more identification methods may also be used to identify the one or more persons involved in order to retrieve, for example, the appropriate personality profile for each person.

In some embodiments, one or more emotional state-related conditions may be determined. Emotional state-related conditions may be any conditions that may affect the emotional state of the one or more persons involved. Examples of emotional state-related conditions may include temperature inside the car, temperature outside the car, severe weather conditions, traffic, presence of road hazards or construction, time of day, day of the week, ambient lighting, road conditions, technical skill required to deal with current driving conditions, surrounding scenery (urban, rural, etc.), etc. In some embodiments, one or more sensors may be used to determine the emotional state-related conditions, such as thermometers, cameras, etc. The emotional state-related conditions may be combined with other information and be considered in determining the one or more optimum HMI tailoring options.

It should be noted that any and all of the above information may be supplemented by receiving input from one or more local persons and/or from one or more remote operators. For example, a person may input into the system what the person may see or hear from the vehicle, conditions that concern them, or simply enter information about their current emotional state. In addition, a remote operator in communication with the system may provide the system with additional information such as weather information, for example.

In some embodiments, a scoring (with weighted criteria) and ranking mechanisms may be used to determine the effectiveness of the different HMI tailoring options. For example, for each potential HMI tailoring option, weights may be assigned (with positive/negative indicators) showing the relative effect that each of a plurality of conditions may have on each HMI tailoring option. In some embodiments, the "effectiveness scores" for each HMI tailoring option may be normalized and ranked.

FIG. 1 is a block diagram illustrating a system for tailoring vehicle Human Machine Interfaces, in accordance with some embodiments.

In some embodiments, HMI tailoring system 160 is configured to determine an optimum HMI tailoring option given driving factors 130 and HMI options 170. In some embodiments, HMI tailoring system 160 may comprise one or more processors 140 and one or more memory units 150, which are coupled to one or more processors 140. Processors 140 and memory units 150 may be configured to perform the functionality of HMI tailoring system 160. In other embodiments, other combinations of hardware units and/or software code may be used to implement HMI tailoring system 160. The driving factors 130 may include passenger data 110 such as music preferences, internal lighting preferences, emotional state, etc. and environmental data 120 such as weather data, traffic data, etc. HMI options may include lighting, music, climate, TTS voices, etc.

Figure 2:
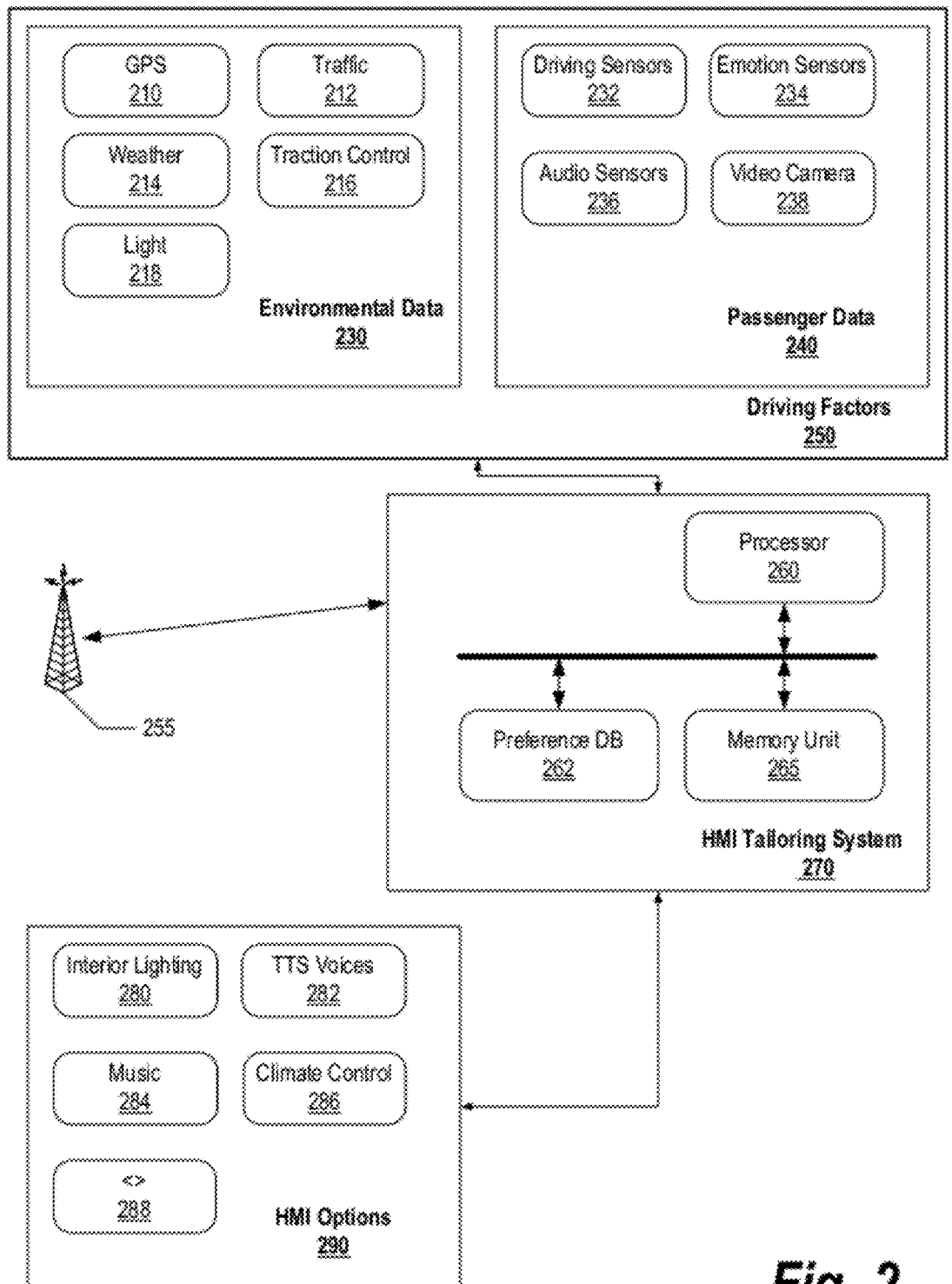
FIG. 2 is a block diagram illustrating an alternative system for tailoring vehicle Human Machine Interfaces, in accordance with some embodiments.

FIG. 2 is a block diagram illustrating an alternative system for tailoring vehicle Human Machine Interfaces, in accordance with some embodiments.

In some embodiments, HMI tailoring system 270 is configured to determine an optimum HMI tailoring option given driving factors 250 and HMI options 290. In some embodiments, HMI tailoring system 270 may comprise one or more processors 260 and one or more memory units 265, which are coupled to one or more processors 260. Processors 260 and memory units 265 may be configured to perform the functionality of HMI tailoring system 270. In other embodiments, other combinations of hardware units and/or software code may be used to implement HMI tailoring system 270.

In some embodiments, driving factors 250 comprises environmental data 230 and passenger data 240. In some embodiments, environmental data 230 comprises GPS data 210, traffic data 212, weather data 214, traction control data 216, and light data 218. Some of this information, such as traffic data 212, weather 214 and light data 218 may be measured directly by sensors on the vehicle or may be transmitted to the vehicle wirelessly from external sources 255. In some embodiments, passenger data 240 comprises driving sensors 232, emotion sensors 234, audio sensors 236, and video cameras 238.

In some embodiments, traction control 216 is configured to measure wheel slippage, indicative of adverse driving conditions, such as rain or frozen precipitation.

In some embodiments, emotion sensors 234 are configured to measure indicators of passengers' emotional states, such as rate of breathing, heart rate, motion, etc.

Figure 3:
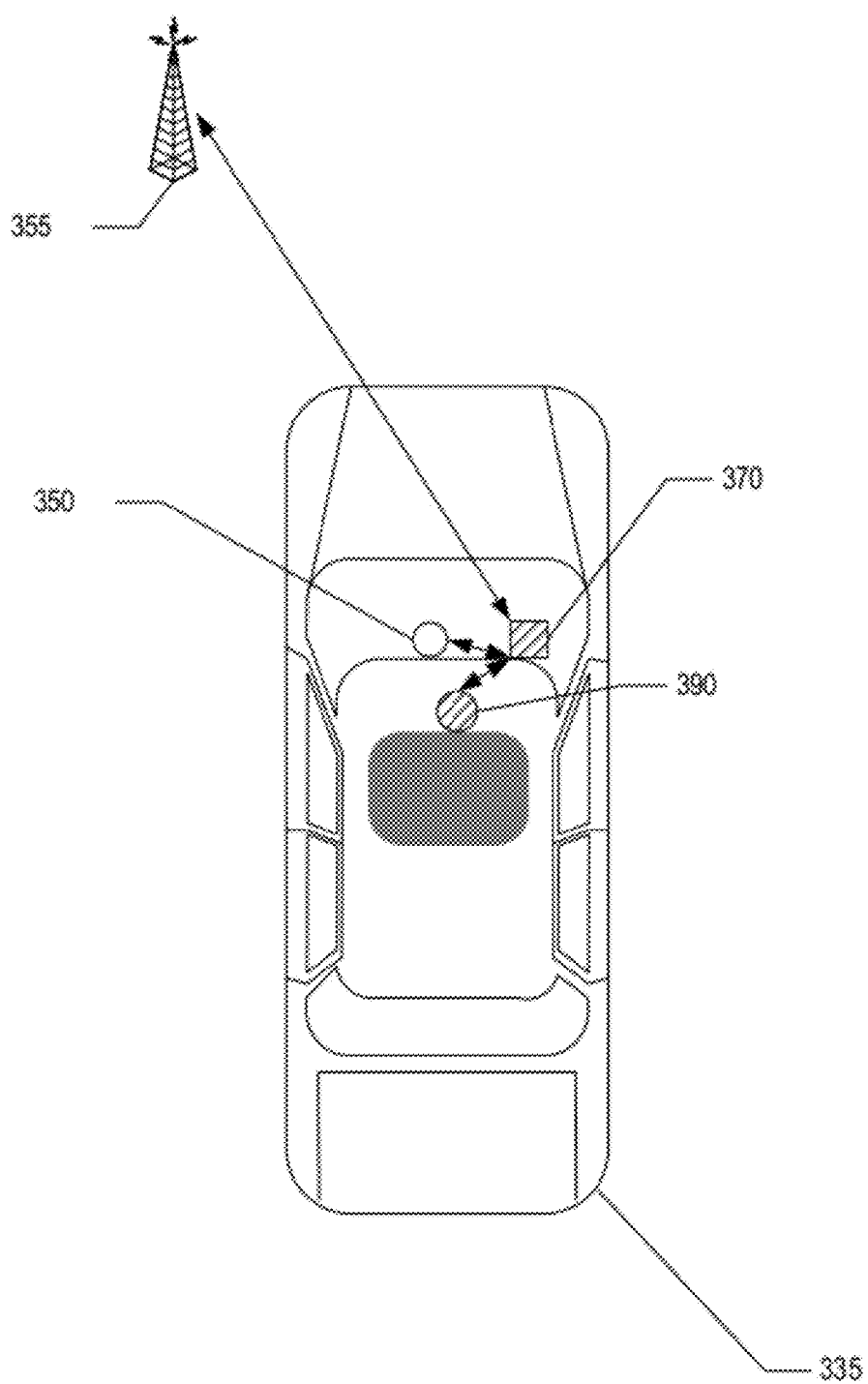
FIG. 3 is a block diagram illustrating a system for tailoring vehicle Human Machine Interfaces as the system may be used in an automobile, in accordance with some embodiments.

FIG. 3 is a block diagram illustrating a system for tailoring vehicle Human Machine Interfaces as the system may be used in an automobile, in accordance with some embodiments.

In some embodiments, vehicle 335 comprises HMI tailoring system 370, which is configured to determine an optimum HMI tailoring option given driving factors 350 and HMI options 390. In some embodiments, HMI tailoring system 370 may comprise one or more processors and one or more memory units coupled to the one or more processors.

In some embodiments, driving factors 350 comprise environmental data and passenger data. In some embodiments, environmental data comprises GPS data, traffic data, weather data, traction control data, light data, etc. Some of this information, such as traffic data, weather, and light data may be measured directly by sensors on the vehicle or may be transmitted to the vehicle wirelessly from external sources 355. In some embodiments, passenger data comprises data collected from driving sensors, emotion sensors, audio sensors, video cameras, etc.

In some embodiments, traction control may be configured to measure wheel slippage, indicative of adverse driving conditions, such as rain or frozen precipitation. In some embodiments, emotion sensors may be configured to measure indicators of passengers' emotional states, such as rate of breathing, heart rate, motion, etc.

Figure 4:
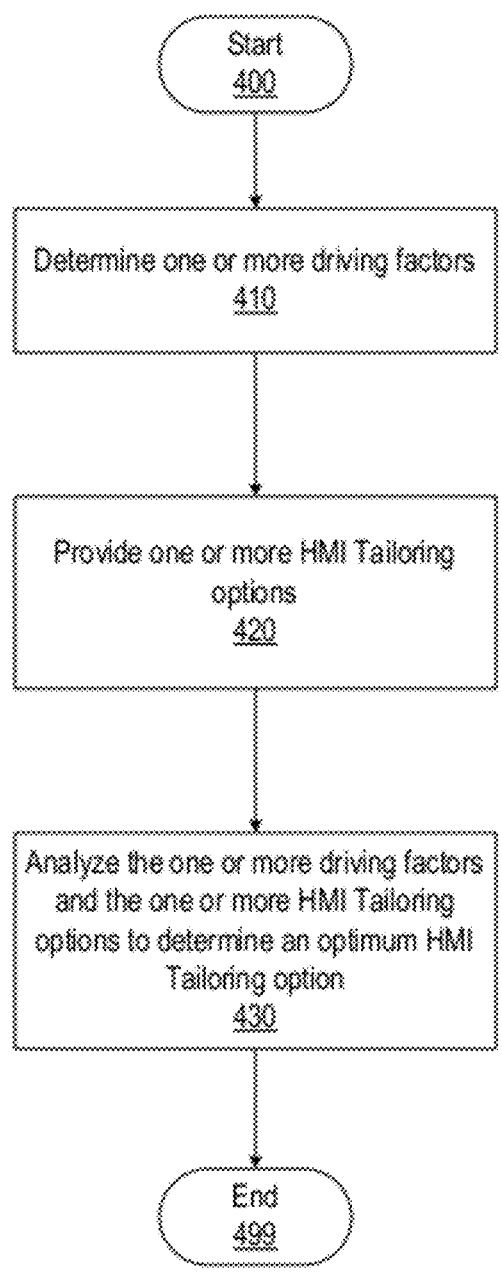
FIG. 4 is a flow diagram illustrating a method for tailoring vehicle Human Machine Interfaces, in accordance with some embodiments.

FIG. 4 is a flow diagram illustrating a method for tailoring vehicle Human Machine Interfaces, in accordance with some embodiments.

Processing begins at 400 whereupon, at block 410, one or more driving factors are determined. In some embodiments, driving factors may include location, date and time, weather, ambient light, digital imaging information, audio information, radio frequency information, the emotional state of passengers, map data, vehicle speed, traffic data, etc.

At block 420, one or more HMI tailoring options are provided. In some embodiments, the one or more HMI tailoring options may include one or more interior lighting options, one or more audio options, one or more vehicle control options, one or more TTS voice options, etc.

At block 430, the one or more driving factors and the one or more HMI tailoring options are analyzed to determine an optimum HMI tailoring option. In one embodiment, in order to determine an optimum HMI tailoring option, the states of one or more driving factors may be analyzed and weighted. In some embodiments, a probability function may be generated for each HMI tailoring option in order to determine which HMI tailoring option has the highest probability of establishing a successful outcome, such as calming the driver, making the passengers happy, etc.

Processing subsequently ends at 499.

Figure 5:
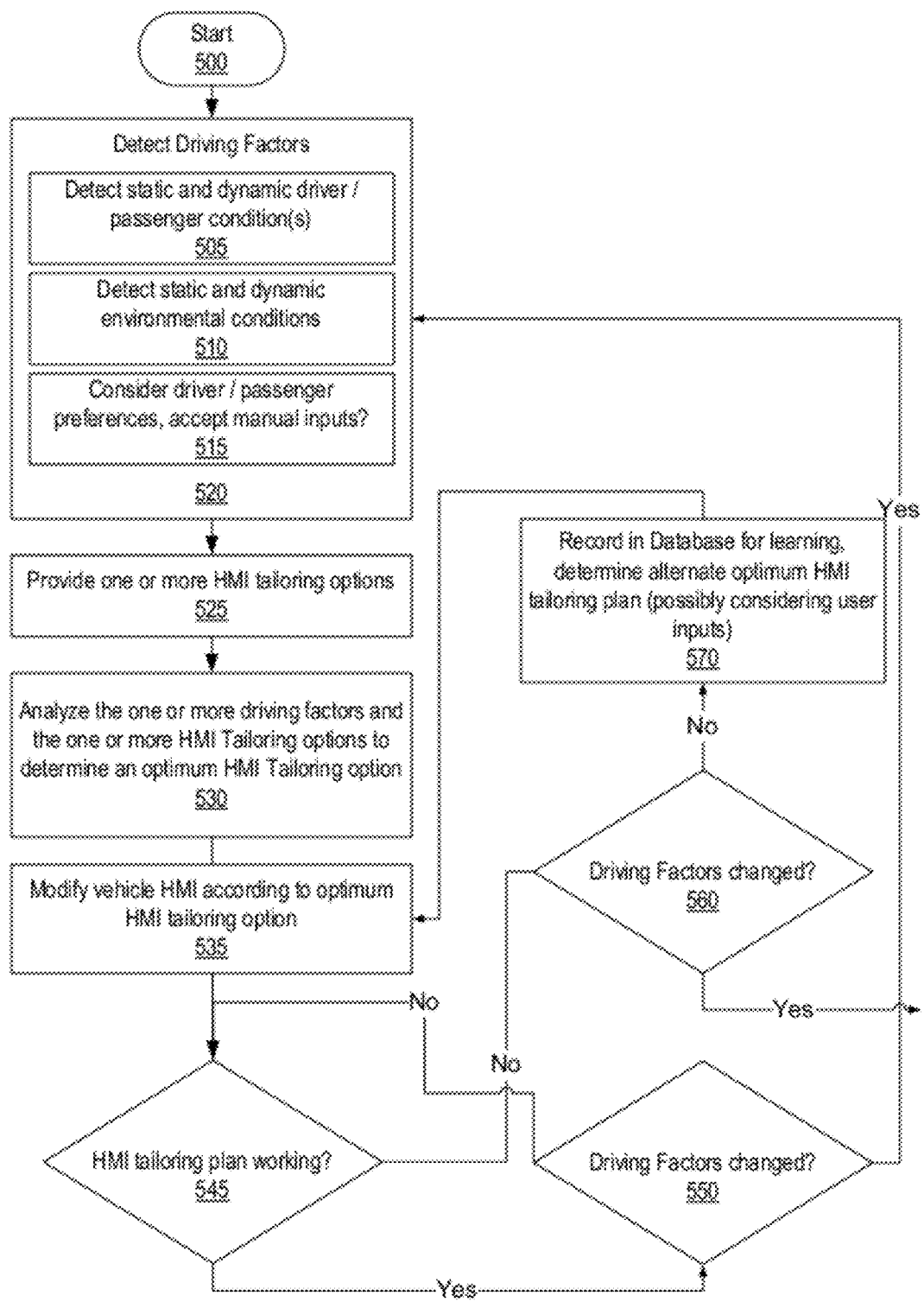
FIG. 5 is a flow diagram illustrating an alternative method for tailoring vehicle Human Machine Interfaces, in accordance with some embodiments.

FIG. 5 is a flow diagram illustrating an alternative method for tailoring vehicle Human Machine Interfaces, in accordance with some embodiments. In some embodiments, the methods described here may be implemented by a device such as the one described in FIG. 1 or FIG. 2.

Processing begins at 500, whereupon, at block 520, one or more driving factors are determined. In some embodiments, driving factors may comprise static and dynamic driver/passenger conditions 505, static and dynamic environmental conditions 510, and driver/passenger preferences 515.

At block 525, one or more HMI tailoring options are provided. At block 530, the one or more driving factors and one or more HMI tailoring options are analyzed to determine an optimum HMI tailoring option. Subsequently at block 535, the vehicle HMI is modified according to the optimum HMI tailoring option.

At decision 545, a determination is made as to whether the HMI tailoring plan is working For example, if the system attempted to calm the driver to induce them to slow down to the posted speed limit, the system would check to see if the driver did indeed slow down. If the HMI tailoring plan is working, decision 545 branches to the "yes" branch and processing continues at decision 550. If the HMI tailoring plan is not working, decision 545 branches to the "no" branch and processing continues at decision 560.

At decision 550, a determination is made as to whether the driving factors have changed or have been predicted to have changed. If the driving factors have not changed or have not been predicted to have changed, decision 550 branches to the "no" branch and processing continues at decision 545. If the driving factors have changed or have been predicted to have changed, decision 550 branches to the "yes" branch and processing continues at block 520, where the new driving factors are detected or analyzed and the process starts over.

At decision 560, a determination is made as to whether the driving factors have changed or have been predicted to have changed. If the driving factors have changed or have not been predicted to have changed, decision 560 branches to the "yes" branch and processing continues at block 520, where the new driving factors are detected and the process starts over. If the driving factors have not changed or have been predicted to have changed, decision 560 branches to the "no" branch and processing continues at block 570.

At block 570, the system makes a record of the fact that the HMI option selected did not achieve the desired outcome despite driving factors remaining constant or occurring as predicted. This record is added to a database to allow the system to improve its determination of optimum HMI option. Subsequently, processing continues at block 530, where a new determination of the optimum HMI tailoring option is made. In some embodiments, user input may be requested in order to make a better HMI selection. The user's input may be then added to the learning algorithm.

Processing subsequently ends at 599.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for tailoring a vehicle's steering sensitivity and a vehicle's accelerator pedal sensitivity, the method comprising:
   determining a location of the vehicle from a navigation system;
   determining the vehicle's surroundings and determining whether there are obstacles around the vehicle using RADAR;
   analyzing map data and predicting from the location and the map data analysis, a condition of a road, which the vehicle will encounter, ahead of where the vehicle is located;
   determining an optimum configuration for the vehicle steering sensitivity and the vehicle accelerator pedal sensitivity responsive to the road condition the vehicle will encounter, ahead of where the vehicle is located; and
   changing the vehicle steering sensitivity and the vehicle accelerator pedal sensitivity, responsive to determining surroundings and responsive to determining obstacles around the vehicle using RADAR, and in advance of encountering the road condition the vehicle will encounter, responsive to the step of determining an optimum configuration for the vehicle steering sensitivity and the vehicle accelerator pedal sensitivity.

2. The method of claim 1, further comprising:
   determining whether a driver is drowsy;
   determining whether a route ahead is monotonous; and
   upon determining that the driver is drowsy and that the route ahead is monotonous, brightening interior lights, modifying an internal temperature of the vehicle, opening windows, changing at least one of a selection of music and a volume of music, and sounding one or more alerts.

3. The method of claim 1, further comprising: based on the determined location of the vehicle, changing TTS voices to at least one of inform and entertain passengers by using voices that reflect at least one of: local attractions, local culture, and local celebrities.

4. The method of claim 1, further comprising: based on the determined location of the vehicle, assisting a driver of the vehicle to conform to local legislation by turning on headlights of the vehicle when windshield wipers are engaged to conform to a state law applicable at the determined location of the vehicle.

5. The method of claim 1, further comprising:
   determining a date;
   determining a time; and
   based on the determined date and the determined time, using serious text-to-speech ("TTS") tones on weekday mornings and festive TTS tones during evenings and weekends.

6. The method of claim 1, further comprising:
   determining whether visibility is low due to at least one of rain and fog;
   upon determining that visibility is due to at least one of rain and fog, dimming interior lighting to help a driver of the vehicle to focus outside the vehicle, and setting music to encourage slower driving.

7. The method of claim 1, further comprising:
   determining whether the vehicle is about to enter a tunnel; and
   upon determining that the vehicle is about to enter a tunnel, dimming an instrument panel display of the vehicle before entering the tunnel.

8. The method of claim 7, further comprising:
   determining whether there is weather data to suggest that it is raining at an exit of the tunnel; and
   upon determining that there is weather data to suggest that it is raining at an exit of the tunnel, providing a notification message that it is raining, closing at least one vehicle window, and turning on headlights of the vehicle before exiting the tunnel.

9. The method of claim 1, wherein changing the vehicle accelerator pedal sensitivity further comprises: making the vehicle accelerator pedal less sensitive to help calm a driver of the vehicle and to prevent tire slippage.

10. The method of claim 9, further comprising: upon determining that there are obstacles around the vehicle using RADAR, dimming interior display lighting to help relax a driver of the vehicle.

11. The method of claim 1, further comprising:
    determining whether a driver of the vehicle is driving aggressively;
    upon determining that the driver of the vehicle is driving aggressively, tailoring a human machine interface of the vehicle to help relax the driver.

12. A system for tailoring a vehicle's steering sensitivity and a vehicle's accelerator pedal sensitivity responsive to road conditions, the system comprising:
    a navigation system;
    a steering system and an accelerator pedal, the operations of which are capable of being tailored;
    one or more processors coupled to: the steering system and accelerator pedal, whereby the one or processors can control sensitivity of the steering system and the accelerator pedal, the one or more processors also being coupled to the navigation system whereby the one or processors can receive current location information from the navigation system;
    one or more non-transitory memory devices coupled to the one or more processors, and storing executable instructions for the one or more processors, which when executed cause the one or more processors to;
    determine the vehicle's current location from the current location information;
    determine the vehicle's surroundings and determine whether there are obstacles around the vehicle using RADAR;
    determine one or more tailoring options for the steering system and the accelerator pedal;
    analyze map data and predict from the current location and map data, a road condition the vehicle will encounter ahead of the current location;
    determine an optimum configuration for the steering system and the accelerator pedal responsive to the predicted road condition; and
    change the vehicle steering sensitivity and the accelerator pedal sensitivity, in advance of encountering the predicted road condition and, responsive to determinations of the vehicle's surroundings and whether there are obstacles around the vehicle using RADAR.

13. The system of claim 12, the system being further configured to receive feedback from the system or vehicle occupants regarding the efficacy of the optimum configuration for the steering system and the accelerator pedal and to record the feedback to improve the system's ability to tailor the steering system and the accelerator pedal effectively.

14. The system of claim 12, further comprising a vehicle, the vehicle comprising the system for tailoring the steering system and the accelerator pedal.

15. A computer program product stored on a non-transitory computer readable medium, the computer program product comprising program instructions, which when executed are effective to:
- determine a current location of a vehicle;
- determine the vehicle's surroundings and, determine whether there are obstacles around the vehicle using RADAR;
- determine one or more available tailoring options for a steering system and an accelerator pedal, operations of which are capable of being tailored;
- analyze map data and predict from the current location and map data, a road condition the vehicle will encounter ahead of the current location;
- determine an optimum tailoring option for the predicted road condition, responsive to available tailoring options; and
- change the vehicle steering sensitivity and the accelerator pedal sensitivity in advance of encountering the predicted road condition, responsive to the determination of the optimum configuration for the steering system and the accelerator pedal and responsive to determining the vehicle's surroundings and determining whether there are obstacles around the vehicle using RADAR.

16. The product of claim 15, where the program instructions being further effective to determine an optimum tailoring option for the steering system and the accelerator pedal, using the vehicle's route due to geographic boundaries.

* * * * *